P. Von Schmidt,
Hydraulic Propeller.

No. 3,606.    Patented May 30, 1844.

P. Von Schmidt,
Hydraulic Propeller.

N° 3,606. Patented May 30, 1844.

3 Sheets. Sheet 3.

P. Von Schmidt,
Hydraulic Propeller.

N° 3,606. Patented May 30, 1844.

UNITED STATES PATENT OFFICE.

PETER VON SCHMIDT, OF WASHINGTON, DISTRICT OF COLUMBIA.

SUBMERGED PROPELLER.

Specification of Letters Patent No. 3,606, dated May 30, 1844.

*To all whom it may concern:*

Be it known that I, PETER VON SCHMIDT, of Washington city, District of Columbia, have invented a new and Improved Mode of Propelling Steamships, Boats, and other Vessels; and I do hereby declare that the following is a full and exact description thereof.

The nature of my invention, called the submerged universal propeller, is, that the propelling power is obtained by the use of fans (similar to the common fans used for cleaning grain,) submerged in a peculiar manner below the surface of the surrounding water, and the apparatus is so constructed, that a steam ship or any other steam vessel may be propelled ahead, backward, or turned round on the spot where it stands, or when under way without loss of time; or without being compelled to stop the steam engine in the operation of changing the direction and position of a vessel; it possesses further, the advantage over all other known mode of propelling, that a vessel may be stopped at pleasure for any length of time without the necessity of stopping the engine, the danger of accumulating a high pressure of steam, may be avoided, and therefore the danger of explosion of the boiler in a great measure diminished, particularly at the moment when the engine is set again in motion.

To enable others skilled in the art to make and use my invention, I will proceed to describe its construction and operation; and I do hereby declare that the following is a full, and exact description of the construction and operation of the same, reference being had to the annexed drawings, making a part of this specification in which—

Figure 1:
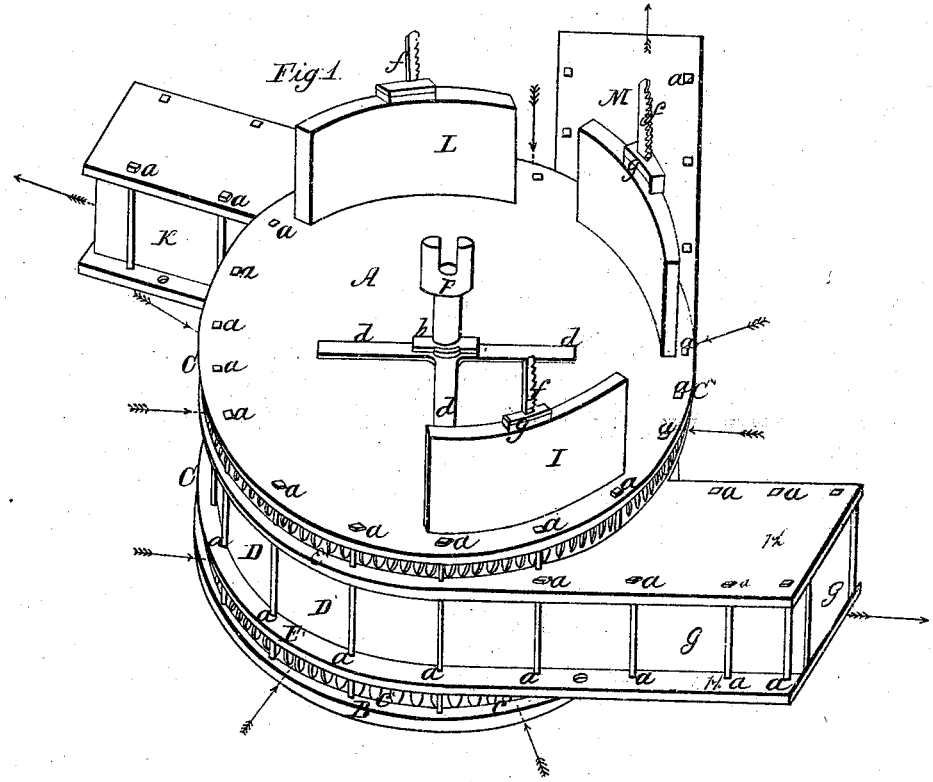

Figure 1 is a perspective view of all the parts visible from the outside of the submerged universal propeller; (A.) the top cover of the box of the propeller; (B,) the lower cover of the box of the propeller. (C, C, C) An opening all around the periphery, above and below the box, to admit the surrounding water into it, and provided with some kind of grating to prevent grass or other substances to enter the box (D D); (D D) the body of the box containing the fans; (E E) a kind of flange above and below the body of the box, to connect by means of the screw bolts ($a, a, a,$ &c.) the covers (A & B) and the grates ($c, c, c,$ &c.) in a solid manner to the box (D D); (F,) the shaft of the fans, ($b$) a stuffing box, ($d, d, d,$) a strong iron cross piece to support the shaft; (G,) the discharge opening by a spout, in length to suit the vessel, for propelling head-ways; (H, H,) the cover and bottom of said spouts, which is a continuance of the flanges (E, E,); (I) a water tight box or chest, which contains a shutter to cut off the communication between the inside of the box (D, D,) and the spout (G, G,); ($f$) a bar and ratch to raise, and depress the shutter in the chest; (J) ($g_i$) a stuffing-box round said bar; (K) a similar spout to back the vessel; (L) a similar chest or box to the same purpose and same arrangements as described at (I); (M,) a similar spout for turning a vessel sideways, the arrangements for opening and shutting the communication with the box (D, D,) is the same at all three spouts, the arrows showing the direction of the current of the water when the propeller is in use in either way.

Figure 7:
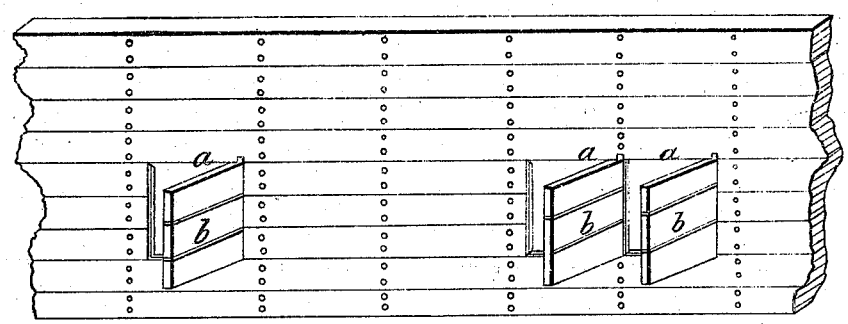

The whole apparatus, or submerged universal propeller is placed horizontally in the inside of the hull of a vessel, and placed in a partition constructed for that purpose, with proper openings to the outside so that the surrounding water may have free access all round the box of said propeller, the extremities of the spouts G, K, open with the outside of the vessel in their proper directions, see Fig. 7, $a, a$, where the two openings of the pipes for backing, and the pipe for turning the vessel sideways, are shown which are closed by movable shutters ($b$ $b,$) fixed at the side of the vessel, and so constructed, that the pressure from the surrounding water about the vessel may close said shutters, but, as soon as the water should press against them from the propeller when in use, the shutters may open of themselves.

Figure 2:
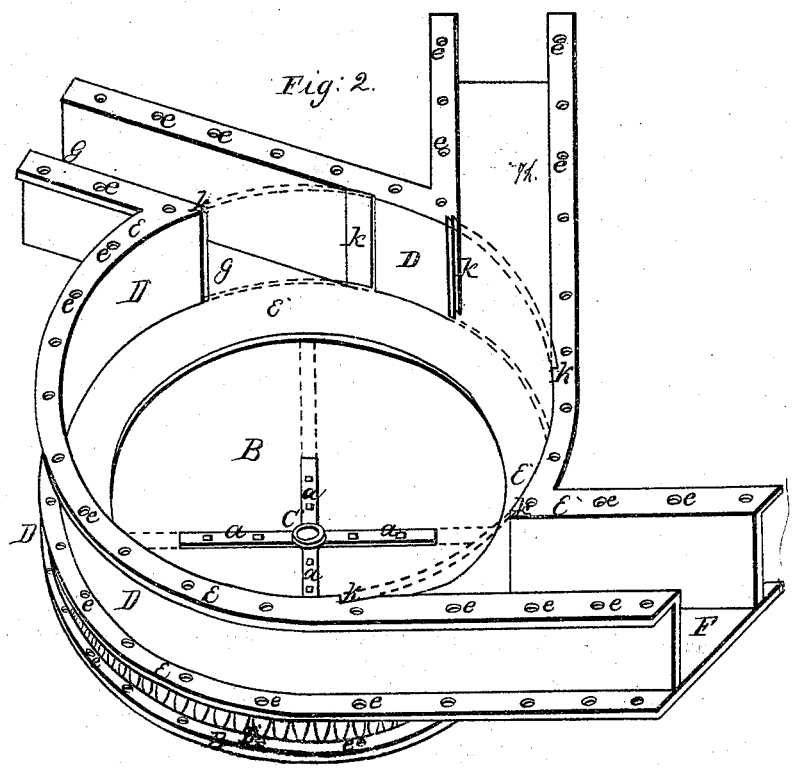

Fig. 2, the same box as represented in (Fig. 1) but the upper cover and the fans removed from the inside; (D D,) the box; (B,) the lower cover of the box; (C,) the ink to receive the shaft, ($a, a, a, a,$) a strong iron cross over all the surface of the cover to support the shaft; ($k$ $k,$) the opening, and grate to admit the water into the box, (E, E, E,) the flanges above and below, to fasten and connect the upper and lower cover; (F,) the inside view from the spout for propelling ahead; (G,) inside view from the spout for propelling backward; (H,) inside view from the spout for turning the vessel sidewise; (k, k, k, &c.) grooves where the shutters have to move, to exclude or to admit the water through each spout; (e, e, e, e, &c.,) holes for the connecting bolts of the box.

Figure 3:
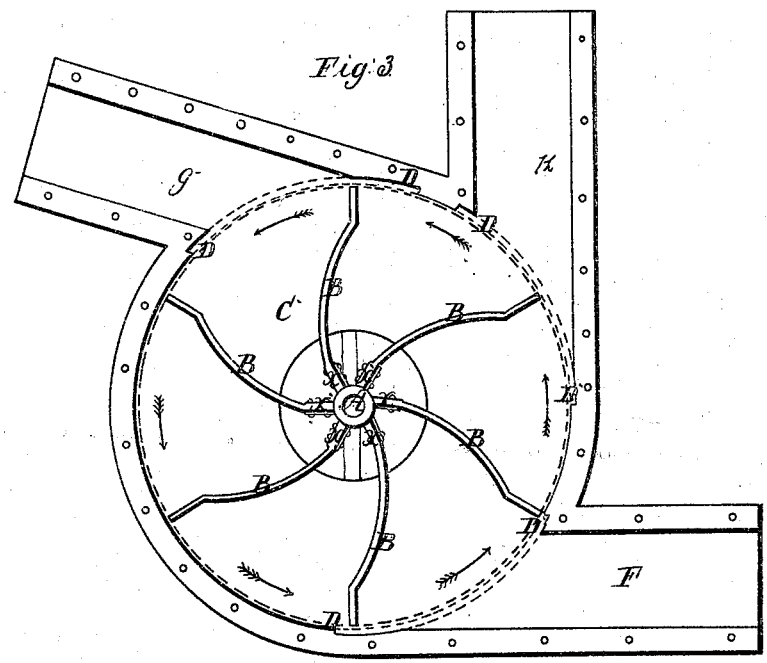

Fig. 3, the same box, as seen from above, the upper cover removed, but the fans in it, in proper position; (F, H, G,) the said spouts as above described; (A,) the shaft of the fans; (B, B, B &c.,) six or more fans fixed on the shaft (A) by the flanges (x, x, x &c.); (C,) the lower plate to connect the fans, in order to give them more strength to resist the water; (D, D, D, &c.) the grooves for the shutters as above described, the darts showing the direction of motion of the fans.

Figure 4:
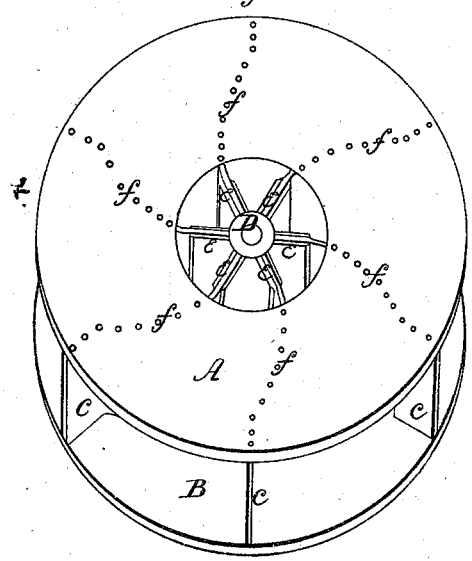

Fig. 4, showing the fans and their fixed connection with the upper and lower circular plates in perspective; (A and B,) the said plates; (C, C, &c.,) the wings of the said fans; (D,) the shaft; (E, E, E, &c.,) the flanges to connect shaft and fans; (f, f, f, &c.,) showing the rivets or screws of said connection.

Figure 5:
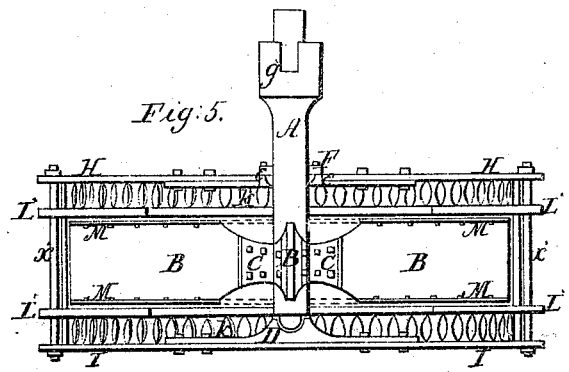

Fig. 5, a longitudinal elevation through the center of the box; (A,) the shaft; (B,) the fans; (C,) the flanges of the shaft; (D,) the ink and iron cross-piece to receive the shaft; (E) the upper iron cross-piece to keep the shaft in its proper place; (F,) a stuffing box; (g,) a coupling to connect the propeller with the moving power; (H, H, and I, I,) the upper and lower covering; (K and K,) the opening and grates above and below; (L, L, L, L,) the flanges above and below to connect the covering and grate with the box by the iron screw bolts (x x &c); (M, M, M, M,) the upper and lower connecting plates of the fans.

Figure 6:
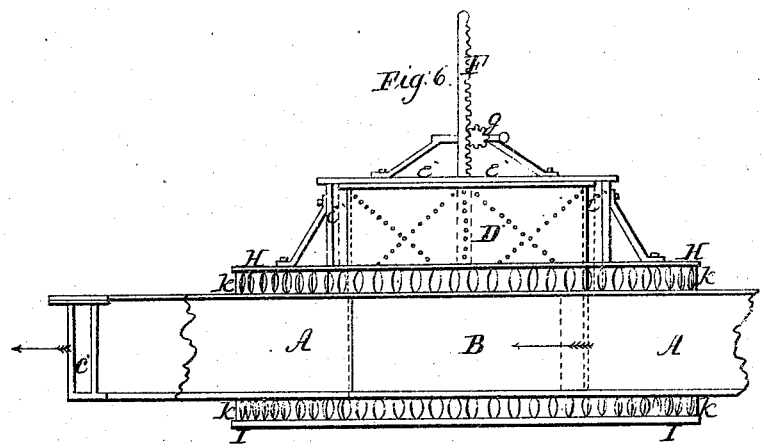

Fig. 6, showing a part of the box and the opening of a spout, the mode of admitting, or shutting out, the current of water coming from the fans; (A, A,) a part of the box; (B,) the opening of the spout in the box; (C,) the extremity of the spout; (D,) the shutter and (E, E,) the frame or chest of said shutter; (F,) the bar and ratch, for raising and depressing shutter; (g,) a pinion in connection for same purpose; (x) showing the groove where the shutter moves up or down; (H and I) the upper and lower cover; (K, K, &c.) showing the upper and lower open space (and grates) to admit the water into the box.

The operation: The whole apparatus of the submerged universal propeller, as above described is to be properly arranged into the hull of a steam vessel in a partition constructed for that purpose, so that the partition, to the inside of the vessel should be water tight, but at the outside of the vessel, as much opening left as necessary for the admission of the required water to supply the fans, into the partition of the apparatus.

The apparatus is to be arranged in a position that the spout or pipe (G, G, Fig. 1,) be parallel with the keel of the vessel, the spout (M) in a right angle with the keel and the spout (K) near to an opposite direction to the spout (G G,). Suppose in such a situation the whole apparatus being immersed under the surface of the surrounding water, and the spout (G G) open, and the spout (M and K) shut, the fans being put in motion by the moving power, the vessel will be propelled ahead. If the spout (G G) being shut without stopping the steam engine, and the spout (K) opened, the vessel will be propelled backward. If the spout (K) should be shut, and (M) opened under the same circumstances, the vessel will turn round, or sidewise. And if all three shutters should be closed the vessel will of course stop—and the engine will continue to work as before, but with more speed, and therefore by this the safety of a vessel will be increased, as the steam is worked off as fast as before and the wated replaced within the boilers by the pumps.

As a matter of course, each vessel so propelled by the said universal submerged propeller should have two apparatus, one at each side, or more if desired, but in some cases, a vessel could be propelled by only one apparatus as before described.

What I claim as my invention and desire to secure by Letters Patent is—

The employment of a wheel inclosed in a case as herein described, having tangent pipes leading forward and out at the side of the vessel, in the manner and for the purpose herein set forth the whole being submerged in a recess in the vessel and acting in any direction at the will of the engineer without reversing the motion of the wheel or in any way checking the engine by means of shutters or gates arranged as above described.

PETER VON SCHMIDT.

Witnesses:
J. J. GREENOUGH,
LAFAYETTE CALDWELL.